July 12, 1932.   A. KAZENMAIER   1,867,078
BRAKE MECHANISM
Filed June 3, 1929
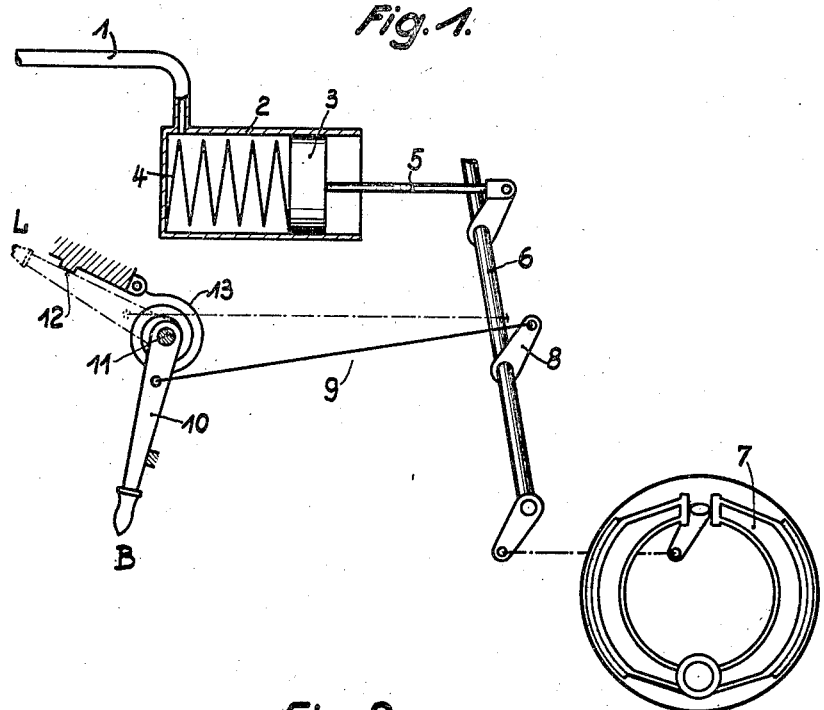
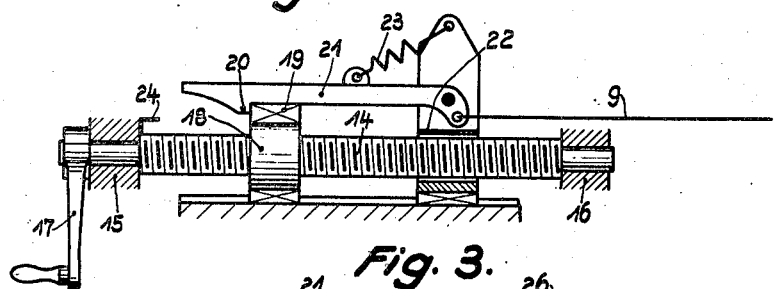
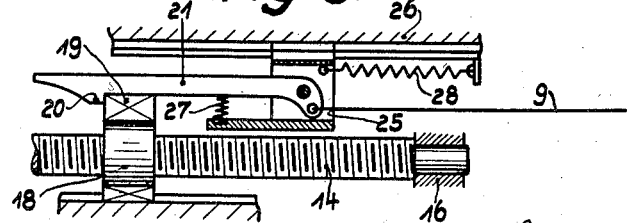

Patented July 12, 1932

1,867,078

UNITED STATES PATENT OFFICE

AUGUST KAZENMAIER, OF STUTTGART, GERMANY, ASSIGNOR TO ROBERT BOSCH AKTIENGESELLSCHAFT, OF STUTTGART, GERMANY

BRAKE MECHANISM

Application filed June 3, 1929, Serial No. 368,105, and in Germany December 3, 1928.

The present invention relates to brake mechanism for vehicles and is particularly adapted for use on trailer vehicles.

A co-pending patent application relates to pressure or vacuum released servo brakes for trailer vehicles in which the releasing motion of a brake piston under the influence of fluid pressure or vacuum is used to release or unlock a manually operated brake-release mechanism from a brake release position. In this said arrangement a connection is provided between the brake piston and the manual means which is effective until the manual means are released by the brake piston after taking off the brakes by hand and which is inoperative when the pressure or vacuum moves the brake piston further in the direction of release. The said manually operated brake mechanism includes a lazy-tongs device, one pair of arms of which is engaged by the above mentioned connection with the brake piston, whilst the other pair of arms co-operate with the halves of a split nut and a spindle.

According to the present invention the mechanism referred to above is considerably simplified by using instead of the lazytongs device, a single lever to which a rotational moment is imparted through the connection with the brake piston by the energy stored up on releasing the brakes, either only in the end position reached on release by hand, or shortly before or after the whole duration of release by hand by which it is automatically forced against a stop limiting its locking movement, and held there.

Several forms of construction according to the invention are shown in the accompanying drawing in which:—

Figure 1 shows diagrammatically a mechanism of this type in connection with a brake releasable by vacuum and applicable by spring power.

Figures 2 and 3 show details of a locking mechanism co-operating with a spindle.

In Figure 1 the pipe 1 is the brake pipe for trailer brake cylinder 2 leading from a tractor vehicle. Pipe 1 is adapted to be connected to any suitable pumping means or other source of fluid pressure or partial vacuum, for example, the suction pipe or intake manifold of an internal combustion engine. The movement of a piston 3 in said cylinder is governed by vacuum in the cylinder and by a spring 4. The piston acts on the brake 7 by means of a rod 5 through a brake shaft 6. A cable 9 leads from a lever 8 on the shaft 6 to a lever 10 pivoting about a pin 11. A stop or abutment 12 limits the movement of the lever 10 in the direction of release of the brakes. One end of a spiral spring 13 is anchored to the lever 10 and the other end is connected with the frame of the vehicle. The spring tends to rotate the lever in a counter-clockwise direction. It is of such dimensions that the rotational moment set up by it in the lever 10 is smaller than that caused by the cable when the lever bears against the stop 12.

The brakes are released by reversing the lever 10 from the position B (braking position) into the position L (release position). The piston 3 is forced into the cylinder 2 by this movement by the cable 9, a lever 8, shaft 6 and rod 5. On moving to the left the piston 3 compresses the spring 4. The lever 10 is retained in the position L by the pressure of the spring 4 as the rotational moment set up in the lever by the spring tension is directed towards the stop 12 after the lever passes over the outer dead centre relative to the cable.

If the driver of the tractor provides a vacuum in the trailer brake pipe 1, the piston 3 will be forced into the brake cylinder slightly beyond the position attained on releasing by hand. The lever 8 will consequently be moved further to the left thereby slackening the cable 9. Whereupon the spiral spring 13 is able to return the lever 10 into its position B. The brake is now ready for operation and can be actuated through the brake valve without the locking means or elements thereof being affected.

The position B of the locking lever 10 can be limited in any suitable manner such as by means of a stop, pawl or the like so that the brake shoes may be moved fully into contact with the drum even when the brake shoes are completely won.

In Figure 2 a spindle 14 is mounted in bearings 15 and 16 in the framework of the vehicle (not shown) so as to be incapable of axial displacement. The spindle 14 is rotated by a crank 17. A nut 18 secured against rotation is mounted on the spindle 14 and travels axially along the latter on rotation thereof. The nut 18 is provided with a stop or abutment 19 over which a notch 20 of a locking lever 21 can engage.

The lever 21 is mounted in a threadless sleeve 22 displacable on the spindle 14. A spring 23 tends to withdraw the lever from the nut 18. An opposite rotational moment is imparted to the lever through the tension in the cable 9 engaging a short arm which is connected to a lever 8 suitably as in Figure 1. A stop or abutment 24 limits the movement of the nut 18 to the left so that the brake piston, which is not shown, can pass in the direction of release under the influence of the vacuum beyond the position which it had in this position of the nut with the cable 9 in tension.

To obtain manual release of the brakes, the nut 18 contacting with the stop 24 at the left must first be moved to the right by rotating the spindle 14 until the notch 20 of the lever 21 can be forced over the stop 19 of the nut 18. The crank 17 is then rotated in the opposite direction so that the nut 18 travels to the left entraining the lever 21 and its bearing 22 and also the cable 9 in this movement. The spring in the brake cylinder is compressed, as in the previous example, and tends to rotate the locking lever so that it remains in engagement with the stop 19 of the nut 18. The latter is forced to the left until it contacts with the stop 24. As soon as sufficient vacuum is obtained in the brake cylinder, the brake piston is moved still further in the direction of release of the brakes, the cable 9 becomes slack and the spring 23 can lift the lever 21 off the stop 19 of the nut 18. On braking, the bearing 22 and lever 21 then move to the right with the brake rod.

In Figure 3 a bearing 25 for the locking lever 21 is not arranged on the spindle 14 but is movable parallel to the axis of the spindle in a guide 26 on the frame of the vehicle. The lever 21 is raised by a compression spring 27. A spring 28 returns the bearing 25 and lever 21 to the right immediately the latter releases itself by slackening of the cable. The operation of the mechanism is otherwise exactly the same as that shown in Figure 2.

I claim:

1. Brake operating mechanism for vehicles comprising a servo cylinder, a piston within said cylinder adapted to move in one direction for release of the brakes and in the opposite direction for application thereof, means associated with said piston for storing up energy on movement of the piston in the direction for release of the brakes and for giving up said energy to cause movement of the piston in the opposite direction to apply the brakes, pumping means adapted to be connected to said cylinder to move the piston in the brake release direction against the resistance of said storing means, an abutment, and a lever for releasing the brakes by hand and having imparted to it a rotational moment from said piston by the energy stored up on release of the brakes which forces it against said abutment limiting its releasing movement and retaining it there.

2. Brake operating mechanism for vehicles comprising a servo cylinder, a piston within said cylinder adapted to move in one direction for release of the brakes and in the opposite direction for application thereof, means associated with said piston for storing up energy on movement of the piston in the direction for release of the brakes and for giving up said energy to cause movement of the piston in the opposite direction to apply the brakes, pumping means adapted to be connected to said cylinder to move the piston in the brake release direction against the resistance of said storing means, an abutment, and a rotatably mounted lever operatively associated with the piston for moving the piston manually into a brake release position and adapted to engage and to be maintained in engagement with said abutment to lock the brakes in a release position by a rotational moment exerted on the lever by said storing means but to be released from engagement with said abutment on decrease of said rotational moment due to further movement of the piston in the brake release direction under the influence of said pumping means.

3. Brake operating mechanism for vehicles comprising a servo cylinder, a piston within said cylinder adapted to move in one direction for release of the brakes and in the opposite direction for application thereof, means associated with said piston for storing up energy on movement of the piston in the direction for release of the brakes and for giving up said energy to cause movement of the piston in the opposite direction to apply the brakes, pumping means adapted to be connected to said cylinder to move the piston in the brake release direction against the resistance of said storing means, an abutment, and a rotatably mounted lever operatively associated with the piston for moving the piston manually into a brake release position and adapted to engage and to be maintained in engagement with said abutment to lock the brakes in a release position by a rotational moment exerted on the lever by said storing means, and resilient means exerting a rotational moment on said lever opposite to the moment exerted by said storing means and adapted to move the lever out of engagement with the abutment on decrease of the rotational moment of the storing means due to further movement of the piston in the brake release direction under the influence of said pumping means.

4. Brake operating mechanism for vehicles comprising a servo cylinder, a piston within said cylinder adapted to move in one direction for release of the brakes and in the opposite direction for application thereof, means associated with said piston for storing up energy on movement of the piston in the direction for release of the brakes and for giving up said energy to cause movement of the piston in the opposite direction to apply the brakes, pumping means adapted to be connected to said cylinder to move the piston in the brake release direction against the resistance of said storing means, a cable operatively associated at one end with said piston, a lever pivoted at one end and connected at a point intermediate of its end to the other end of said cable and adapted to be rotated beyond an outer dead centre position relative to said cable for displacing the piston into a brake release position, a stop adapted to engage the lever in its brake release position and to prevent rotation of the lever under the rotational moment exerted through the cable by said storing means and a spring exerting a rotational moment on the lever in a direction opposite to that of the cable and adapted to move the lever out of engagement with said stop on decrease of said rotational moment due to further movement of the piston in the brake release direction under the influence of said pumping means.

5. Brake operating mechanism for vehicles comprising a servo cylinder, a piston within said cylinder adapted to move in one direction for release of the brakes and in the opposite direction for application thereof, means associated with said piston for storing up energy on movement of the piston in the direction for release of the brakes and for giving up said energy to cause movement of the piston in the opposite direction to apply the brakes, pumping means adapted to be connected to said cylinder to move the piston in the brake release direction against the resistance of said storing means, a threaded spindle axially fixed but rotatable about its longitudinal axis, a threaded nut on said spindle adapted for axial movement on rotation of the spindle, an abutment on said nut, a bearing member movable longitudinally of said spindle, a lever pivotally mounted on said bearing member, a notch on said lever for engagement with said abutment to cause movement of the lever and bearing member in one direction on rotation of said spindle in the appropriate direction, a cable connection between said lever and the piston for causing movement of the piston into a brake release position against the resistance of the storing means on movement of said lever and nut in the brake release direction and adapted to exert a rotational moment on the lever to hold this in engagement with the abutment on the nut and a spring exerting a rotational moment on the lever opposite to that of the cable and adapted to cause release of the lever from engagement with said abutment on slackening of said cable due to further movement of the piston in the brake release direction under the influence of said pumping means.

6. Brake operating mechanism for vehicles comprising a servo cylinder, a piston within said cylinder adapted to move in one direction for release of the brake and in the opposite direction for application thereof, spring means associated with said piston for storing up energy on movement of the piston in the direction for release of the brakes and for giving up said energy to cause movement of the piston in the opposite direction to apply the brakes, pumping means adapted to be connected to said cylinder to move the piston in the brake release direction against the resistance of said spring means, an abutment, and a rotatably mounted lever operatively associated with the piston for moving the piston manually into a brake release position and adapted to engage and to be maintained in engagement with said abutment to lock the brakes in a release position by a rotational moment exerted on the lever by said spring means but to be released from engagement with said abutment on decrease of said rotational moment due to further movement of the piston in the brake release direction under the influence of said pumping means.

7. Brake operating mechanism for vehicles comprising a servo cylinder, a piston within said cylinder adapted to move in one direction for release of the brakes and in the opposite direction for application thereof, spring means associated with said piston for storing up energy on movement of the piston in the direction for release of the brakes and for giving up said energy to cause movement of the piston in the opposite direction to apply the brakes, pumping means adapted to be connected to said cylinder to move the piston in the brake release direction against the resistance of said spring means, an abutment, and a rotatably mounted lever operatively associated with the piston for moving the piston manually into a brake release position and adapted to engage and to be maintained in engagement with said abutment to lock the brakes in a release position by a rotational moment exerted on the lever by said spring means, and resilient means exerting a rotational moment on said lever opposite to the moment exerted by said spring means and adapted to move the lever out of engagement with the abutment on decrease of the rotational moment of the spring means due to further movement of the piston in the brake release direction under the influence of said pumping means.

8. Brake mechanism for vehicles comprising a brake, means tending to apply said brake, manual means operable to hold said brake in released position, means urging said manual means to braking position, said manual means adapted to be held in brake-releasing position by the means tending to apply the brake, and servo mechanism operable to release the brake and to permit the manual means to move to braking position.

In testimony whereof I have hereunto affixed my signature.

AUGUST KAZENMAIER.